(12) United States Patent
Yacoub

(10) Patent No.: US 9,769,117 B2
(45) Date of Patent: Sep. 19, 2017

(54) DOMAIN NAME VARIANT GENERATION

(71) Applicant: VERISIGN, INC., Reston, VA (US)

(72) Inventor: Souheil Ben Yacoub, Fribourg (CH)

(73) Assignee: VERISIGN, INC., Reston, VA (US)

( * ) Notice: Subject to any disclaimer, the term of this patent is extended or adjusted under 35 U.S.C. 154(b) by 318 days.

(21) Appl. No.: 14/193,307

(22) Filed: Feb. 28, 2014

(65) Prior Publication Data

US 2015/0249640 A1    Sep. 3, 2015

(51) Int. Cl.
*H04L 29/12* (2006.01)
*G06F 17/28* (2006.01)
*H04L 29/08* (2006.01)

(52) U.S. Cl.
CPC ......... *H04L 61/6004* (2013.01); *G06F 17/28* (2013.01); *H04L 61/3025* (2013.01); *H04L 67/02* (2013.01); *H04L 61/302* (2013.01)

(58) Field of Classification Search
CPC .................................................. H04L 61/6004
USPC ........................................................ 709/203
See application file for complete search history.

(56) References Cited

U.S. PATENT DOCUMENTS

| | | | |
|---|---|---|---|
| 6,332,158 B1 | 12/2001 | Risley et al. | |
| 6,560,634 B1 | 5/2003 | Broadhurst | |
| 7,546,381 B2 | 6/2009 | Tout | |
| 7,559,085 B1* | 7/2009 | Wahl | H04L 63/1441 |
| | | | 713/151 |
| 8,069,187 B2 | 11/2011 | Adelman et al. | |
| 8,285,830 B1 | 10/2012 | Stout et al. | |
| 2004/0220903 A1 | 11/2004 | Shah et al. | |
| 2008/0092242 A1* | 4/2008 | Rowley | H04L 63/1483 |
| | | | 726/27 |
| 2011/0166935 A1 | 7/2011 | Armentrout et al. | |
| 2012/0047153 A1* | 2/2012 | Thomas | G06F 17/30707 |
| | | | 707/754 |
| 2012/0047173 A1 | 2/2012 | Thomas | |
| 2012/0271877 A1 | 10/2012 | Nicks et al. | |
| 2012/0271878 A1 | 10/2012 | Nicks et al. | |
| 2012/0331121 A1 | 12/2012 | Colosi | |

FOREIGN PATENT DOCUMENTS

WO    2011/053669 A1    5/2011

OTHER PUBLICATIONS

Extended European Search Report dated Jul. 28, 2015, European Application No. 15156889.6, pp. 1-8.
Linari et al., "Typo-Squatting: The "Curse" of Popularity", Proceedings of the WebSci'09: Society On-Line, Mar. 18-20, 2009, Athens, Greece, pp. 1-6.
Jacob Gube, "Excellent Tools for Picking a Domain Name", Mar. 12, 2009, http://sixrevisions.com/resources/12-excellent-tools-for-picking-a-domain-name/, pp. 1-7.

* cited by examiner

*Primary Examiner* — Vivek Srivastava
*Assistant Examiner* — Sibte Bukhari
(74) *Attorney, Agent, or Firm* — MH2 Technology Law Group, LLP

(57) ABSTRACT

Domain name variants may be generated and/or displayed by accessing historical domain name information and identifying, based on the accessed historical domain name information a set of swap options. The swap options may include one or more graphemes. Variants of a domain names may be determined based on the identified set of swap options.

20 Claims, 8 Drawing Sheets

Input domain Name: اختبار

Variants with probability

| اختبأر 0.63 | أختبار 0.71 | آختبار 0.54 | إختبار 0.82 |
|---|---|---|---|
| اختبآر 0.58 | أختبأر 0.01 | آختبأر 0.34 | إختبأر 0.32 |
| اختبِار 0.42 | أختبِار 0.02 | آختبِار 0.30 | إختبِار 0.21 |
|  | أختبِارِ 0.01 | آختبِارِ 0.07 | إختبِارِ 0.11 |

FIG. 8

Domain Name: * [ كرسي ] —902      [Search]

904 — Name (Variants)
906 — Rating
908 — NGram Ranks
910 — Geography
912 — NXD match
914 — Register

Domain Name Variants    900

| Name (Variants) TLD ▼ | Rating ◇ | NGram Ranks ◇ | Geography | NXD match | Register |
|---|---|---|---|---|---|
| كرسي.com | Low | 0 | DE,US,UA,RU,CN,NL,PL | 5.6 🔍 | ☐ |
| كرسي.com | Low | 2 | EG,LY | 1.4 🔍 | ☐ |
| كرسي.com | High | 17 | | 0.0 🔍 | ☐ |
| كرسي.com | High | 17 | | 0.0 🔍 | ☐ |
| كرسي.com | Medium | 2 | | 0.0 🔍 | ☐ |
| كرسي.com | Low | 0 | | 0.0 🔍 | ☐ |
| كرسي.com | Low | 0 | | 0.0 🔍 | ☐ |

FIG. 9

| Domain Detail | ✗ |
|---|---|
| 1002 — Name (Variants) | كرسى.com |
| 1004 — Punycode | xn--wgbe0c0a.com |
| 1006 — 7 days Score | 2.7 |
| 1008 — 30 days Score | 1.5 |
| 1010 — 60 days Score | 1.4 |
| 1012 — CC (totalHits : uniqueHits) | EG=2:1,LY=7:2 |
| 1014 — Variant Score | 26169 |

FIG. 10

DOMAIN NAME VARIANT GENERATION

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. The alphanumeric name is called a "domain name." For example, the domain name for a hypothetical computer system operated by Example Corporation may be "comp23.example.com". Using domain names, a user attempting to communicate with this computer system could specify a destination of "comp23.example.com" rather than the particular IP address of the computer system (e.g., 198.81.209.25). Domain names may include character sets such as upper and lower-case letters a-z and digits 0-9. Internationalized Domain Names are domain names that include characters used in the local representation of languages that are not written with the twenty-six letters of the basic Latin alphabet "a-z". An IDN can contain Latin letters with diacritical marks, as required by many European languages, or may include characters from non-Latin scripts such as Arabic or Chinese. Many languages also use other types of digits than the European "0-9". The basic Latin alphabet together with the European-Arabic digits are, for the purpose of domain names, termed "ASCII characters" (ASCII=American Standard Code for Information Interchange). These are also included in the broader range of "Unicode characters" that provides the basis for IDNs.

BRIEF DESCRIPTION OF THE DRAWINGS

The accompanying drawings, which are incorporated in and constitute a part of this specification, illustrate, together with the description, examples of the present disclosure. In the figures:

FIG. 8 is an example display of domain name variants, in accordance with one or more examples as discussed herein;

FIG. 9 is an example display of domain name variants, in accordance with one or more examples as discussed herein;

FIG. 10 is an example display of details relating to a domain name variant, in accordance with one or more examples as discussed herein.

DETAILED DESCRIPTION

With the introduction and increasing use of internationalized domain names (IDNs), registrants may encounter new challenges when registering a domain name. For example, in scripts that are new to the Internet Naming space, but used by a large population of users (i.e., Chinese, Cyrillic, Hangul, Arabic, etc.), a user may generate a domain name request utilizing one or more graphemes that, although may visually appear to be the same, are not exactly the same as the one or more graphemes in a registered domain name. This may result in a request for a non-existent domain (NXD). NXD data, including the domain name request, may be stored in a storage for analysis.

In order to avoid a domain name request including a non-existent domain name, as discussed herein, one or more variants of a domain name may be determined based on a substitution of one or more graphemes. For example, pairs of graphemes may be identified as commonly being substituted for each other. This may be determined based on analysis of stored NXD data, based on analysis of registered domain names, etc. In some examples, the determined domain name variants may be presented on a display and offered for registration thereby allowing the registrant to register domain name variants.

As further discussed herein, variant likelihood data of a script may be generated, for example, from historical domain name information, for example, from NXD data, registered domain names, a language corpus, etc. Variant likelihood data may include, for each grapheme in a script, possible variants of the grapheme. Thus, in considering variants of a domain name, variants of one or more graphemes in the domain name may be substituted in order to generate variants of the domain name.

As further discussed herein, in considering a domain name, a set of swap options may be identified from a variant likelihood storage. One or more variants of the domain name may be determined based on the identified set of swap options and provided, for example, to client device.

It may be appreciated that by determining variants of a domain name, a registrant of a domain name may have the opportunity to register variants of a domain name. This may ensure that other users access the intended registered domain, even if the domain name a user is trying to access includes one or more graphemes that are different from the graphemes in the registered domain name.

Figure 1:
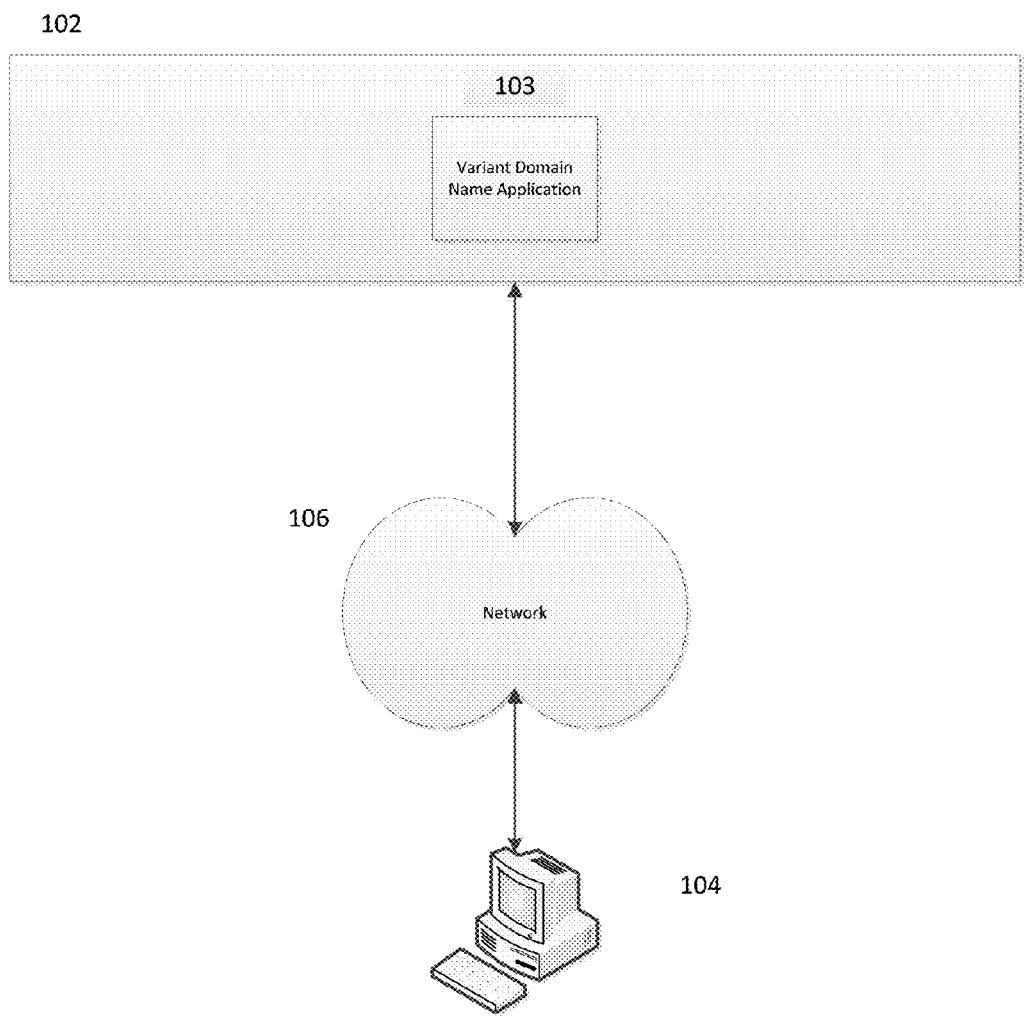
FIG. 1 is an example system environment for generating and/or displaying variant likelihood data and/or variant domain names, in accordance with one or more examples disclosed herein.

FIG. 1 depicts an example system environment 100 for determining one or more variants of a domain name. It may be appreciated that additional elements may be included in system environment 100 and some of the elements may be removed and/or modified without departing from the spirit and scope of this disclosure.

As shown in FIG. 1, system environment 100 may include apparatus or device 102 including variant domain name application 103 for generating domain name variants. Device 102 may be communicably linked to apparatus or device 104 through network 106. Device 104 may be implemented as a client computing device, an administrative computing device, etc. Domain name variants generated at device 102 may be provided to device 104 through network 106.

Device 102 may be implemented as a server, a mainframe computer, any combination of these components, or any other appropriate computing device, resource service, for example, cloud, etc. Device 102 may be standalone, or may be part of a subsystem, which may, in turn, be part of a larger system. It may be appreciated that, while device 102 may be described as includes various components, one or more of the components may be located at other devices (not shown) within system environment 100. As shown in FIG. 1, device 102 may include a variant domain name application 103 for generating variant domain names.

Client device 104 may be implemented as any computing device, for example, a desktop computer, laptop computer, portable computing device, etc. Client device 104 may enable communication with device 102 receive variants of domain names and may further enable selection and registration of variant domain names.

Additionally, each of device 102 and 104 includes the necessary hardware and/or software needed to communicate with the network 106 via a wired and/or a wireless connection. Device 102 and 104 may be embodied by server computing device, desktop/laptop/handheld computers, wireless communication devices, personal digital assistants or any other similar devices having the necessary processing and communication capabilities. In an embodiment, the network 106 may comprise a public communication network such as the Internet or World Wide Web and/or a private communication network such as a local area network (LAN), wide area network (WAN), etc.

One or both of devices 102 and 104, which may comprise one or more suitable computing devices, implement the functionality as discussed herein As discussed herein, devices 102 and 104 include one or more processors in communication with one or more storage devices. The processor(s) may comprise a microprocessor, microcontroller, digital signal processor, co-processor or other similar devices known to those having ordinary skill in the art. The applications described herein may be implemented as either software, firmware and/or hardware applications and may be implemented as a set of computer or machine-readable instructions stored in any type of non-transitory computer-readable or machine-readable storage medium or other storage device. Some non-limiting examples of non-transitory computer-readable mediums may be embodied using any currently known media such as magnetic or optical storage media including removable media such as floppy disks, compact discs, DVDs, BLU-RAY, flash memory, hard disk drives, etc. In addition, the storage device(s) as discussed herein may comprise a combination of non-transitory, volatile or nonvolatile memory such as random access memory (RAM) or read only memory (ROM). One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

Figure 2:
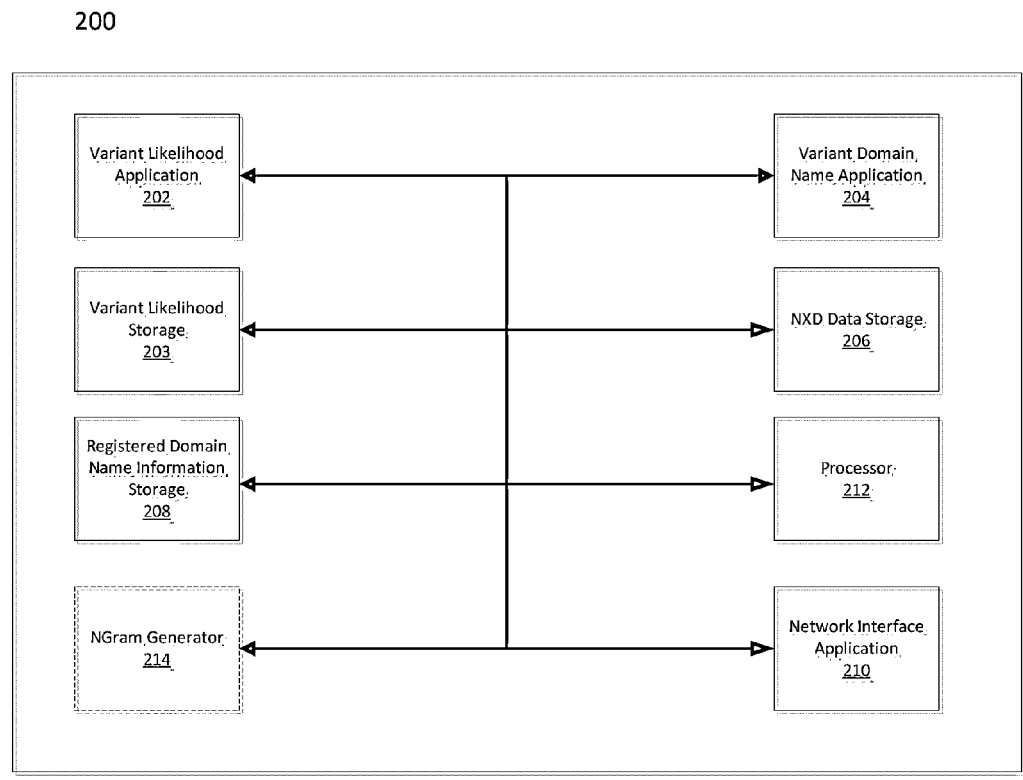
FIG. 2 is an example block diagram of components included in a device for generating and/or displaying variant domain names, in accordance with one or more examples disclosed herein.

FIG. 2 depicts an example configuration of device 102 depicted in FIG. 1. As shown in FIG. 2, device 200 may include variant likelihood application 202, variant likelihood storage 203, variant domain name application 204, NXD data storage 206, registered domain name information storage 208, network interface application 210, processor 212, and ngram generator 214.

Variant likelihood application 202 may identify, or generate, variants of graphemes in scripts, and store the identified variants in association with the graphemes in variant likelihood storage 203 as, for example, a table, array, etc. As used herein, a grapheme may be a unit of a writing system, for example, a letter, a digraph, a plurality of letters, etc.

Variants of graphemes may be generated based on historical domain name information. The historical domain name information may include NXD data, registered domain name information, registered domain name information from one or more Top-Level Domains, registered domain name information from one or more WHOIS databases, registered domain data from Trademark Clearing House Data, etc. For example, historical domain name information may include domain names that were included in requests generated by users, where the domain name in the request resulted in a non-existent domain name. Historical domain name data may, in addition, or alternatively, include registered domain names.

In the case where the historical domain name information is NXD data, NXD data may be tested for edit distance (Levenshtein distance), etc., against existing domain names in order to identify one or more pairs of graphemes that, when swapped in the NXD data, result in an existing domain name. For example, strings in NXD requests may be compared with strings in existing domain names using a comparison algorithm, for example, edit distance, etc. The distance between the two strings may be calculated. If the distance between the two strings is small, in other words, only 1 or 2 characters are different between the strings, and the characters are in the same or similar position in the string, then the 1 or 2 characters in one string may be considered swap options of the 1 or 2 characters in the other string, and visa versa. For all of the strings that are compared, those swap options that occur most frequently, for example, occur more than a predetermined threshold, etc., may be stored and used to generate domain name variants as discussed herein.

Thus, if a particular swapping of graphemes in NXD data creates a match to an existing domain name, then the grapheme in the NXD data may be considered a swap option for the grapheme in the registered domain name. The grapheme of the NXD data may be associated with, and stored as a swap option for, the grapheme in the registered domain name in variant likelihood storage. It may be appreciated that, similarly, the grapheme of the registered domain name may be associated with, and stored as a swap option for, the grapheme in NXD data in variant likelihood storage.

According to some examples, the position of the swap option in a word or string may be stored in association with the swap option.

As discussed herein, the swap option may include alternatives to one or more graphemes, for example, based on similarity of appearance of the grapheme, a known variant of a grapheme (for example, certain graphemes have different appearances depending on where the grapheme appears in the word), a different spelling of a word based on the country of origin, etc.

For example, in Arabic, grapheme U+06A9, namely, ک has a similar appearance to other forms of the grapheme, namely ﻜ, ﻛ, and ﻚ, the isolated, final and medial forms respectively. When analyzing the NXD data, the variant likelihood application may compare NXD data to see how many times ک has been swapped, for example, for ﻜ. If, after comparing the NXD data to registered domain name data, there were one or more instances where the swap of the two characters in NXD domain request resulted in a registered domain, then ﻜ may be considered a variant of the grapheme ک and stored in variant likelihood storage. It may be appreciated that in one example, if there was one instance where the swap resulted in a registered domain name, then the pair may be entered in the variant likelihood storage. In another example, a threshold may be set where a certain number of instances may occur before the pair is entered in the variant likelihood storage.

In another example, registered domain names may be accessed and analyzed to identify variants of graphemes in a script. In other words, registered domain names may be compared with other similar registered domain names in order to identify graphemes that, when swapped, result in a registered domain name. When analyzing the registered domain name data, the variant likelihood application may compare registered domain names to other registered domain names to see how many times, for example, ک has been swapped, for example, for ﻜ. If there were one or more instances where the swap of the two characters in the registered domain name resulted in another registered domain name, then ﻜ may be considered a variant of the grapheme ک and stored in variant likelihood storage.

It may be appreciated that, as discussed herein, just as a single grapheme may be identified as having swap options, a plurality of graphemes may have swap options. For example, where the spelling of a word in one country may have a different spelling in another country, the alternative spelling may be a swap option that is stored in variant likelihood storage. For example, the word "color" may be spelled as "colour" in the United Kingdom. Thus, "our" may be stored as a swap option for "or" in the variant likelihood storage.

In addition to swap options, variant likelihood storage may further store a degree of similarity for each swap option. The degree of similarity may be calculated based on the number of times, during analysis of the historical domain name information, the swap of the graphemes resulted in a registered domain name. For example, the degree of similarity may be calculated as the probability of the swap of the graphemes resulting in a registered domain name. Specifically, the degree of similarity may be a count of how frequently a swap option occurs when analyzing NXD and registered domain name data by dividing the total number of swaps for the swap option by the total number of words that contained the candidate character for swap. For example, in considering United Kingdom v. United States: "o" to "our", if there are 1000 names containing the character "o" and there are 200 names that have the "o"→"ou" swap, the degree of similarity is 0.2. This value may further be weighted by the position of the character. The degree of similarity may be an indication of how likely the pair of graphemes may be swapped when entered by a user. This degree of similarity may be used to determine a likelihood of confusion of a variant of domain name, as more fully discussed below.

Variant likelihood storage 203 may store swap options for graphemes in scripts. It may be appreciated that multiple scripts may be stored, each of the scripts having associated therewith a plurality of graphemes, where each of the plurality of graphemes has associated therewith one or more swap options.

Figure 3:
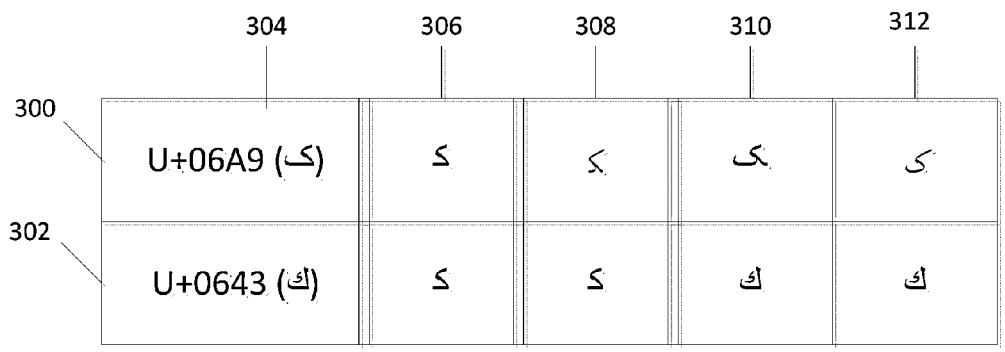
FIG. 3 is an example of entries of a variant likelihood storage, in accordance with one or more examples disclosed herein.

FIG. 3 depicts an example of entries 300, 302 in variant likelihood storage 203. Entry 300 depicts swap options 306, 308, 310 and 312 for grapheme 304, namely U+06A9 ((ک.

Variant domain name application 204 may generate variants of domain names. The domain names may be registered domain names, or unregistered domain names.

Variant domain name application 204 may analyze a domain name to determine if swap options exist for one or more graphemes in the domain name. Variant domain name application 204 may access variant likelihood application 202 in order to determine if swap options exist for one or more graphemes, and/or one or more groups of graphemes in a domain name. If one or more swap options exist for a domain name, variant domain name application 204 may generate domain name variants based on the identified swap options.

One or more of the generated domain name variants may be provided, for example, to a client device, to storage, to a display, etc. In some examples, the one or more generated domain name variants may be provided based, for example, on predefined rules, etc. Alternatively, all of the generated domain name variants may be provided. Predefined rules may include, for example, that a pre-defined number of the most likely to be confused domain name variants may be provided, that only variants having a probability of confusion over a predetermined threshold may be provided, that all determined variants may be provided, etc. These predefined rules may be set by a user, for example, through an interface having user-actuatable buttons, pull-down menus, fields to receive data, etc. In some examples, it may be appreciated that these pre-defined rules may be set by default.

NXD data storage 206 may store data relating to requests for Internet domain names that were unable to be resolved using the DNS implementation owing either to the domain name not yet being registered or a server problem.

Registered domain name information storage 208 may store registered domain name information.

Network interface application 210 facilitates network communication between device 102 and device 104.

Processor 212 may execute computer-readable instructions, stored in storage, to perform functionality as described herein.

Ngram generator 214 may access a set of data and calculate generate a set of ngrams from the set of data. For example, the set of data may include one or more of a language corpus, registered domain names, historical unresolved domain requests, etc. Ngrams generated by ngram generator 214 may be used to calculate an ngram rank as more fully discussed below.

It may be appreciated that ngram generator 214 may reside at device 200, or may reside in a separate device (shown or not shown) within system environment 100.

Figure 4:
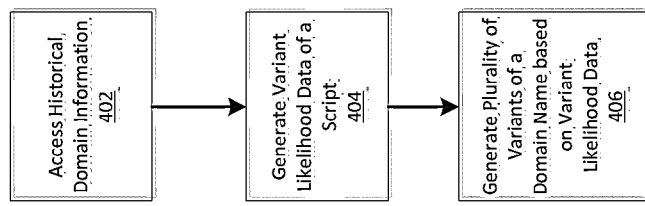
FIG. 4 is an example flow diagram of a method for generating domain name variants, in accordance with one or more examples disclosed herein.

FIG. 4 depicts an example flow diagram of a process for generating a plurality of variants of a domain name based on variant likelihood data. As shown in FIG. 4, historical domain name information is accessed (402). Historical domain name information may include NXD data, registered domain name information, etc.

This historical domain name information may be analyzed to identify pairs of graphemes that, when swapped for each other, result in a registered domain name. For example, the variant likelihood application may test unresolved domain name requests for edit distance against registered domain names from the same script as the unresolved domain requests. If swapping one or more of the original graphemes in an unresolved domain name request with one or more different graphemes creates a match to a registered domain name, the one or more graphemes in the unresolved name request may be associated and stored as a swap option for the one or more graphemes in the registered domain name in the variant likelihood storage.

Variant likelihood data of graphemes of a script may be generated (404). Identified pairs of graphemes that, when swapped for each other, result in a registered domain name, may be stored as variant likelihood data in a variant likelihood storage. The variant likelihood data of the script may include, for those graphemes in the script having swap options, the grapheme of the script, and the swap options for the grapheme of the script. It may be appreciated that the swap options for the grapheme of the script may include one or more graphemes from the same script, and/or one or more graphemes of a different script.

Variants of a domain name may be generated based on the variant likelihood data (406).

The variants of the domain name may be generated by analyzing the graphemes in the domain name, accessing the variant likelihood storage to determine if there are any swap options the one or more graphemes in the domain name, and swapping the swap options into the domain name to generate all of the possible different variants of the domain name based on the available swap options. One or more of the generated domain name variants may be provided based on predefined rules that may be set by a user through a user interface.

If swapping of one or more original graphemes in an unresolved domain request with one or more swapped graphemes creates a match to a registered domain, a degree of similarity of the one or more swapped graphemes with the original one or more graphemes may be determined. The determined degree of similarity may be stored in association with the one or more swapped graphemes in a variant likelihood storage.

A likelihood of confusion for each of the plurality of domain name variants may be determined based on the stored degree of similarity associated with each of the swapped graphemes. For example, the likelihood of confusion for a particular domain name variant may be calculated as the product of each of the degrees of confusion for each swap option that was made in generating the domain name variant. Specifically, in calculating the likelihood of confusion for a particular domain name variant, the probability associated with each of the swap options is multiplied in order to generate a likelihood of confusion.

The plurality of domain name variants, together with the calculated likelihood of confusion, may be provided, for example, to storage, to a display, to a remote device, etc.

Figure 5:
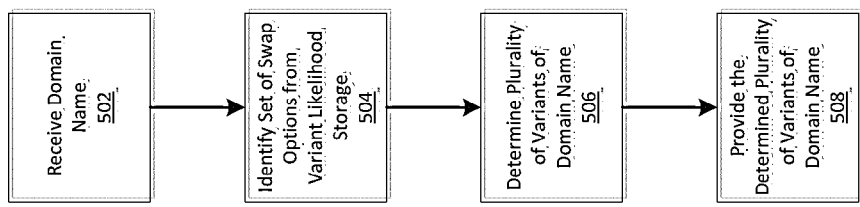
FIG. 5 is an example flow diagram of a method for providing a plurality of determined domain name variants, in accordance with one or more examples as discussed herein.

FIG. 5 depicts an example flow diagram of a process for determining a plurality of variants of a domain name. As shown in FIG. 5, a domain name may be received (502). A domain name may be received at a device, for example, from a client device, from a storage device, etc. The domain name may be received, for example, from a registrant seeking to register the domain name. In another example, the domain name may be received from a storage device as a domain name that is already registered. A set of swap options may be identified from variant likelihood storage (504). The set of swap options may be determined based on the graphemes in the received domain name. The set of swap options may include one or more graphemes from a different script.

A plurality of variants of the received domain name may be determined (406). The determined variants may be provided (508). The determined variants may be provided, for example, to a client device, to a display, to storage, etc.

A likelihood of confusion for each of the determined plurality of variants may be determined based on a degree of similarity associated with each of the swap option. The determined likelihood of confusion for each of the determined plurality of variants may be provided, for example, to storage, to a display, to a device, etc.

The determined plurality of variants of the domain name may be provided with an option to register one or more determined domain name variants. For example, in a user interface on a display, the domain name variants may be displayed. The domain name variants may be displayed with an indicator of a likelihood of confusion. The indicator of a likelihood of confusion may be a number, or may be a visual indicator of the likelihood of confusion, for example, a color, an image, for example, a flag, etc., a dashboard with an indicator, etc.

In some examples, a geographic region from which the domain name was received may be determined. The set of swap options from the variant likelihood storage may be identified based on the geographic region from which the domain name was received.

According to some examples, during the process of identifying swap options, an additional check may be made during the string comparison process to determine what geographic region the NXD requests originated in. If, for a swap option, a percentage of requests that are coming from one or more countries, for example, exceed a predetermined threshold, those one or more countries may be stored in association with the swap option. This may indicate that the swap option is more prevalent in that particular country than in other countries.

When considering registered domains, where two domain names have been identified as compatible variants for a particular swap, the historical DNS traffic may be analyzed by country and identify the origin of traffic by country, region, geography, etc. If certain regions are over-represented, for example, the percentage of traffic exceeds a predetermined threshold, it may be used in the variant generation recommendation process discussed herein.

Figure 6:
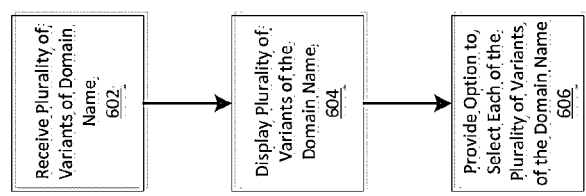
FIG. 6 is an example flow diagram of a method for providing an option to select one or more domain name variants, in accordance with one or more examples as discussed herein.

FIG. 6 depicts an example flow diagram of a process for displaying variants of a domain name. As shown in FIG. 6, a plurality of domain names may be received (602). The received plurality of domain names may be displayed on a display (604). One or more options may be provided to the user to select each of the plurality of variants of the domain name (606).

By providing the options to the user to select each of the plurality of variants of the domain name, the user may have the opportunity to register, block for another to register, etc., variants of a domain name, where the variants of the domain name have a likelihood of confusion with the received domain name. As noted above, the likelihood of confusion may be a number and/or may include other visual indicators.

It may be appreciated that, in some examples, one or more variants of the domain name may be automatically blocked by an administrator of a registry of domain names. This may be implemented as a service to the registrant, whereby one or more variants of the domain name may not be registered by other registrants.

The receiving of the plurality of variants of a domain name may be based on transmission of a request to register the domain name. In other words, if a user wishes to register a domain name, the variants of the requested domain name may be provided to the user, together with indicates of the likelihood of confusion of each of the domain name variants, in order to ensure that other users wishing to access the domain name may access the domain name even if graphemes, while not typographical errors, but may be from a different script, similar in appearance, are used.

Figure 7:
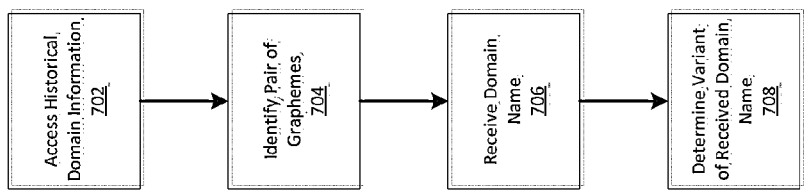
FIG. 7 is an example flow diagram of a method for determining domain name variants, in accordance with one or more examples as discussed herein.

FIG. 7 depicts an example flow diagram of a process for determining variants of a domain name. As shown in FIG. 7, historical domain name information may be accessed (702). The historical domain name information may NXD data, registered domain name data, etc.

One or more pairs of graphemes may be identified, where the one or more pairs of graphemes includes a first grapheme that is substituted for a second grapheme (704). A degree of similarity of the first grapheme being substituted for a second grapheme. The determined degree of similarity may be utilized in determining a likelihood of confusion based on the calculated degree of similarity and provided with the determined variant of the domain name.

The likelihood of confusion may be provided with a visual indicator, such as a color, an image, a dashboard, etc., to provide a visual indication of the likelihood of confusion.

The determined domain name variant may be provided with an option, via a user interface, to register the determined domain name variant.

A domain name may be received (706). One or more variants of the received domain name may be determined based on the identified pair of graphemes (608).

FIG. 8 depicts an example display 800 including the input, or received, domain name 802 and the determined variants of domain name 804. In this example, 15 variants of the domain name 802 were generated. Below each of the determined domain name variants, the associated likelihood of confusion is displayed. In this example, the associated likelihood of confusion may be the probability of the variant being confused. It may be appreciated that each of the boxes surrounding the domain name variants may be actuatable, thereby enabling the user to select one or more domain name variants for registration.

Each of the 15 variants of the domain name 802 may be generated via the processes discussed herein, by applying the swap options generated utilizing the stored NXD data, registered domain names, etc.

It may be appreciated that the determined variants of a domain name may be presented to a registrant at the time the registrant is seeking to register the domain name, or at a time after the domain name has been registered. For example, the system discussed herein may, for example, periodically, review registered domain names by determining domain name variants as discussed herein, and transmit the determined domain name variants to the registrant of the domain name. The transmitted determined domain name variants may include an opportunity, for example, a link, an actuatable button, etc., for the registrant to register one or more of the determined domain name variants.

FIG. 9 depicts a display alternative to the display depicted in FIG. 8. FIG. 9 depicts an example display 900 including the input, or received domain name 902, and the determined variants of domain name 904. In this example, seven variants of the domain name 902 were generated. For each variant generated, a rating 906 is provided that indicates how strongly the variant should be considered. Rating 906 may be calculated based on the thresholding of the degree of similarity that is calculated for each of the variants. Rating 906 may be displayed in addition to, or instead of displaying the degree of similarity.

For each variant generated, ngram ranks 908 may be calculated and provided. An ngram rank may be a numeric score representing a frequency in which one or more domain's ngrams, including a swapped grapheme, match a corresponding ngram mined from one or more of a language corpus, historical unresolved domain requests, registered domain names, etc.

Geography 910 may further provided for each of variant generated. Geography 910 may include a list of the countries that were identified during the swap option identification process noted above. This may provide an indication that the variant that was generated should be considered if the domain name is to be used in one or more of the countries that are listed.

For each variant generated, NXD match 912 may be provided. NXD match 912 may indicate how frequently the swap option occurred in NXD data. For each of the variants that are generated, register 914 may be displayed to provide a means for a user to register one or more of the variants.

FIG. 10 depicts a display that may be presented on a display device after one of the variants depicted in FIG. 9 is selected. FIG. 10 depicts details regarding the selected variant. Specifically, as shown in FIG. 10. The variant domain name 1002 is depicted. The punycode 1004 is provided. 7 days score 1006 represents the NXD score within the past 7 days. 30 days score 1008 represents the NXD score in the past 30 days. 60 days score 1010 represents the NXD score in the past 60 days. As seen in FIG. 10, the data from the past 7 days is more relevant than the data from the past 30 or 60 days as there were a higher number of hits in the past 7 days. CC (TotalHits: uniqueHits) 1012 represents the countries where the variant is relevant. As shown in FIG. 10, the variant is relevant in Egypt and Lybia. The value after each country represents the total number of hits in the country and the total number of unique hits. This may assist in identifying whether many users are creating the hits, or if one user is creating many hits. Variant score 1014 depicts the degree of similarity.

Figure 11:
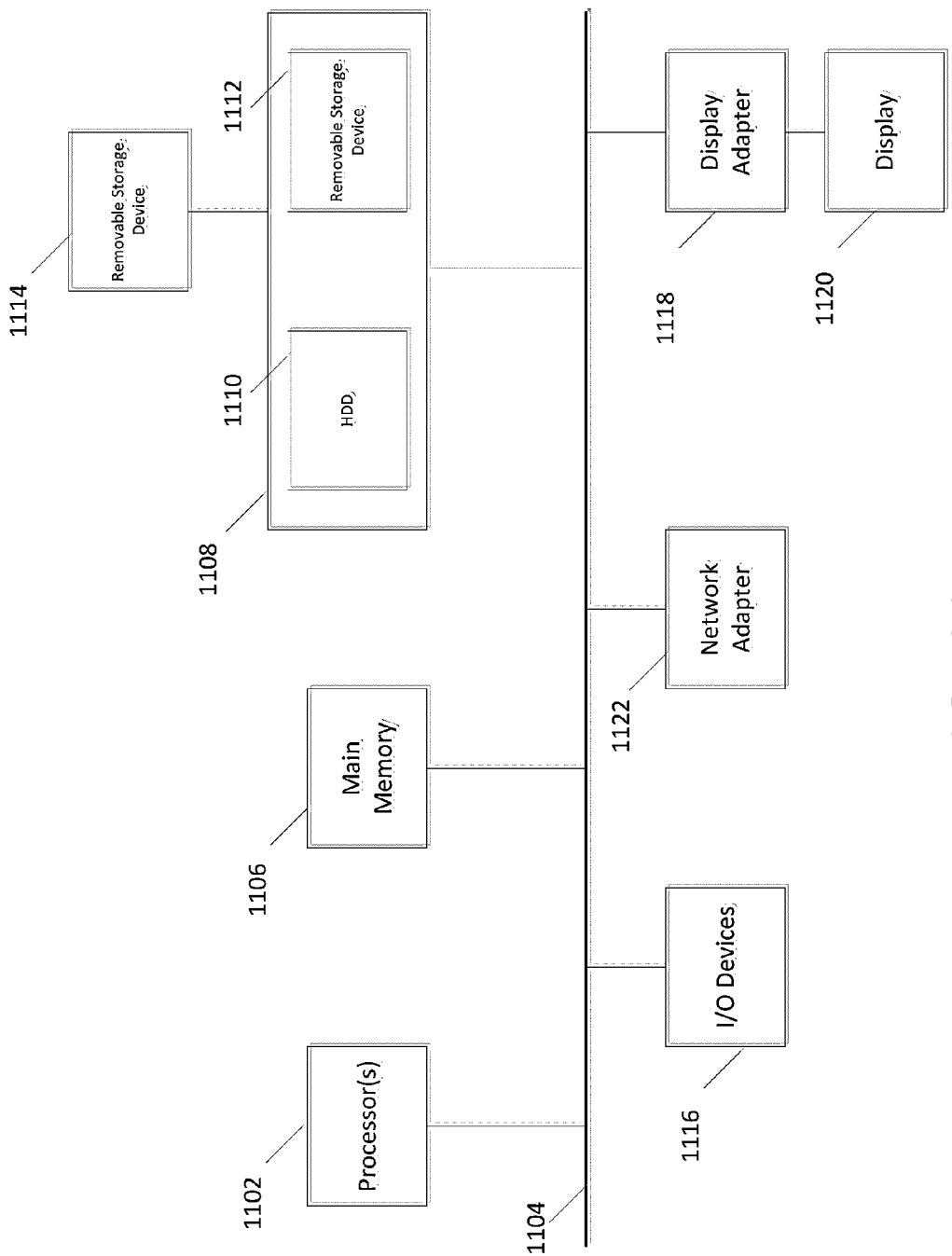
FIG. 11 is an example computer system or apparatus that may be used as a platform for executing the functionality discussed herein.

FIG. 11 illustrates a block diagram of a computing apparatus 1100, such as the device 200 depicted in FIG. 2, according to an example. In this respect, the computing apparatus 1100 may be used as a platform for executing one or more of the functions described hereinabove.

The computing apparatus 1100 includes one or more processors 1102, such as the processor(s) 212. The processor(s) 1102 may be used to execute some or all of the steps described in the methods depicted in FIGS. 4-7. Commands and data from the processor(s) 1102 are communicated over a communication bus 1104. The computing apparatus 1100 also includes a main memory 1106, such as a random access memory (RAM), where the program code for the processor(s) 1102, may be executed during runtime, and a secondary memory 1108. The secondary memory 1108 may includes, for example, one or more hard disk drives 710 and/or a removable storage drive 1112, representing a floppy diskette drive, a magnetic tape drive, a compact disk drive, etc., where a copy of the program code for the methods depicted in FIGS. 4-7 may be stored.

The removable storage drive 1110 may read from and/or writes to a removable storage unit 1114 in a well-known manner. User input and output devices 1116 may include a keyboard, a mouse, a display, etc. A display adaptor 1118 may interface with the communication bus 1104 and the display 1120 and may receive display data from the processor(s) 1102 and convert the display data into display commands for the display 1120. In addition, the processor(s) 1102 may communicate over a network, for instance, the Internet, LAN, etc., through a network adaptor 1122.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, comprising:
accessing, via a processor implemented at least in part in hardware, historical domain name information, the historical domain name information including a plurality of historical domain names;
identifying a pair of graphemes including a first grapheme and a second grapheme by comparing the plurality of historical domain names, wherein the second grapheme is a variant of the first grapheme;
calculating a degree of similarity of the pair of graphemes based at least partially on a frequency in which the first grapheme is substituted by the second grapheme in the plurality of historical domain names;
receiving a domain name, wherein at least one grapheme in the domain name includes the first grapheme;
generating a domain name variant based on the pair of graphemes and the at least one grapheme in the domain name;
calculating a likelihood of confusion of the domain name variant with the domain name based on the degree of similarity of the pair of graphemes; and
providing the domain name variant and the likelihood of confusion of the domain name variant with the domain name.

2. The computer-implemented method of claim 1, wherein the plurality of historical domain names include one or more non-existent domain names requested in historical unresolved domain requests.

3. The computer-implemented method of claim 1, wherein the plurality of historical domain names include one or more registered domain names.

4. The computer-implemented method of claim 1, wherein the plurality of historical domain names include registered domain names and non-existent domain names requested in historical unresolved domain name requests, the method further comprising:
testing the non-existent domain names for edit distance against the registered domain names to identify one or more of the non-existent domain names;
determining that swapping of an original grapheme in the one or more non-existent domain names with a different grapheme creates a match to one or more of the registered domain names; and
entering the different grapheme in association with the original grapheme in the pair of graphemes.

5. The computer-implemented method of claim 1, wherein the likelihood of confusion of the domain name variant with the domain name includes a visual indicator including at least one of a color, an image, or a dashboard with an indicator.

6. The computer-implemented method of claim 1, further comprising:
providing the domain name variant with an option to register the domain name variant.

7. A computer-implemented method, comprising:
accessing, via a processor implemented at least in part in hardware, historical domain name information including a plurality of historical domain names;
generating a plurality of swap options for graphemes in a script by comparing the plurality of historical domain names, wherein each of the plurality of swap options is associated with at least one grapheme of the graphemes and includes a variant of the at least one grapheme;
calculating, for each swap option of the plurality of swap options, a degree of similarity based on a frequency in which the at least one grapheme associated with the swap option is substituted, in the plurality of historical domain names, by the variant of the at least one grapheme in the swap option;
identifying, for a domain name, one or more swap options of the plurality of swap options based on at least one grapheme in the domain name;
generating a plurality of domain name variants of the domain name based at least partially on the one or more swapped options;
determining, for each of the plurality of domain name variants, a likelihood of confusion of the domain name variant with the domain name based on the degree of similarity associated with each of the one or more swapped options used to generate the domain name variant; and
providing, for each of the plurality of domain name variants, the domain name variant and the likelihood of confusion of the domain name variant with the domain name.

8. The computer-implemented method of claim 7, further comprising:
associating one or more of the plurality of swap options with a geographic region.

9. The computer-implemented method of claim 7, wherein the plurality of historical domain names include one or more non-existent domain names requested in historical unresolved domain requests.

10. The computer-implemented method of claim 7, wherein the plurality of historical domain names include one or more registered domain names.

11. The computer-implemented method of claim 7, wherein generating the plurality of swap options includes:
selecting, from the plurality of historical domain names, a set of historical domain names each including one or more graphemes in the script, wherein the set of historical domain names include a set of registered domain names and a set of non-existent domain names requested in historical unresolved domain name requests;
testing the set of non-existent domain names for edit distance against the set of registered domain names;
determining that swapping of one or more original graphemes in a non-existent domain name in the set of non-existent domain names with one or more different graphemes creates a match to a registered domain name in the set of registered domain names; and
entering the one or more different graphemes in association with the one or more original graphemes in the plurality of swap options.

12. The computer-implemented method of claim 11, wherein entering the one or more different graphemes further comprises:
 determining a degree of similarity of the one or more different graphemes with the one or more original graphemes; and
 storing the degree of similarity in association with the one or more different graphemes in the plurality of swap options.

13. A computer-implemented method, comprising:
 receiving, via a processor implemented at least based in part in hardware, a domain name;
 identifying, based on the domain name, a set of swap options including one or more variants of at least one grapheme in the domain name, wherein the one or more variants of the at least one grapheme are identified by comparing a plurality of historical domain names in historical domain name information;
 obtaining, for each swap option of the set of swap options, a degree of similarity of the swap option to the at least one grapheme, wherein the degree of similarity corresponds to a frequency in which the at least one grapheme is substituted by the swap option in the plurality of historical domain names;
 generating a plurality of domain name variants of the domain name based on the set of swap options;
 obtaining, for each of the plurality of domain name variants, a likelihood of confusion of the domain name variant with the domain name calculated based on the degree of similarity of each swap option used to generate the domain name variant; and
 providing the plurality of domain name variants and the likelihood of confusion of each of the plurality of domain name variants with the domain name.

14. The computer-implemented method of claim 13, wherein the plurality of historical domain names include one or more non-existent domain names requested in historical unresolved domain requests.

15. The computer-implemented method of claim 13, wherein identifying the set of swap options includes:
 determining a geographic region from which the domain name was received; and
 identifying the set of swap options based on the geographic region.

16. The computer-implemented method of claim 13, further comprising:
 providing the plurality of domain name variants with an option to register one or more of the plurality of domain name variants.

17. The computer-implemented method of claim 13, wherein the at least one grapheme in the domain name and at least one swap option of the set of swap options are in different scripts.

18. A computer-implemented method, comprising:
 receiving, via a processor implemented at least in part in hardware, a plurality of domain name variants of a domain name, each domain name variant of the plurality of domain name variants including:
  at least one grapheme in the domain name swapped with a set of grapheme variants of the at least one grapheme identified by comparing a plurality of historical domain names in historical domain name information, wherein a degree of similarity of each grapheme variant in the set of grapheme variants to the at least one grapheme corresponds to a frequency in which the at least one grapheme is substituted by the grapheme variant in the plurality of historical domain names; and
  an indication of a likelihood of confusion of the domain name variant with the domain name calculated based on the degree of similarity of each grapheme variant in the set of grapheme variants used to generate the domain name variant;
 displaying the plurality of domain name variants and the indication of the likelihood of confusion of each of the plurality of domain name variants with the domain name on a display; and
 providing an option to select one or more of the plurality of domain name for registration.

19. The computer-implemented method of claim 18, further comprising:
 transmitting a request for registration of the domain name, wherein the plurality of domain name variants are displayed in response to the request for registration of the domain name.

20. The computer-implemented method of claim 18, wherein the indication of the likelihood of confusion of each of the plurality of domain name variants with the domain name includes a visual indicator including at least one of a color, an image, or a dashboard.

* * * * *